Patented Mar. 11, 1947

2,417,281

UNITED STATES PATENT OFFICE 2,417,281

INSTRUMENT LUBRICANT

Jones I. Wasson and John C. Zimmer, Union, N. J., assignors to Standard Oil Development Company, a corporation of Delaware No Drawing. Application November 10, 1944, Serial No. 562,913

2 Claims. (Cl. 252—33.4)

The present invention relates to the field of lubricants generally, and more particularly to improved lubricating compositions adapted to the lubrication of fine instruments and delicate mechanisms such as those employed in watches, clocks, meters, weather recording instruments, galvanometers, aircraft instruments, scientific instruments, shell fuses, ordnance fire control and gun directing equipment, and the like.

Lubricating compositions in the nature of those of the present invention must possess special characteristics in order to adequately and fully meet the special requirements placed upon lubricants of this type. Such oils should possess a pour point below —30° F. and preferably below —60° F. Their flash points should be above 300° F. and preferably above 400° F. so as to eliminate the fire hazard arising from the use of more volatile oils and to minimize loss by evaporation over prolonged periods, particularly in air or gas turbine driven instruments such as gyro compasses, supercharger mechanisms, etc. They should have a low temperature viscosity coefficient in order to provide adequate lubrication over the wide range of temperatures. Such oils should be chemically stable, particularly stable against the action of atmospheric oxygen in the presence of metals so as not to become gummy or corrosive due to the formation of acidic bodies after long periods of use. Also such oils should show good adherence to metals but should not creep or spread.

The need for the lubricant having a low pour point, particularly with regard to the lubrication of aircraft instruments, which are often subjected to extremely low temperatures in the air, is manifest. Ordinary atmospheric temperatures, that is ground level temperatures, vary over a rather wide range becoming at times excessively high, particularly in the tropics so that an oil to meet these conditions must be sufficiently viscous at these higher temperatures that it will not drain or flow from the bearing being lubricated. On the other hand it must not be too thick to interfere with the movements of instrument components at temperatures extending down to —80° F. encountered at high altitudes in the troposphere. Where a lubricant is required to function under such a wide range of climatic conditions it is imperative that it have a low temperature viscosity coefficient. It would be a relatively simple matter to provide a lubricant capable of furnishing adequate lubrication within any narrow range of fixed conditions and let the lubricant be changed to suit changing conditions if it were not for the fact that many of these mechanisms are so constructed and incased that it requires the services of a specially trained expert to service them. Since servicing is supplied only periodically and often after the lapse of a considerable period of time, lubricants designed for this type of service should be capable of meeting all of these strict qualifications.

The principal object of the present invention is the provision of a lubricating composition having a low pour point, a low viscosity-temperature coefficient, a high flash point or extremely low vapor pressure to avoid loss by evaporation, chemically stable and free from excessive creeping. This and other objects will be apparent to those skilled in the art upon reading the following description.

It has now been found that the esters of aliphatic dibasic acids, particularly those esters in which the esterifying radical is a branched chain alkyl radical, have a majority of the properties required in an instrument oil, that is, they possess unusually high boiling points and resulting low vapor pressures at ambient temperatures, high viscosity indices, or low viscosity-temperature coefficients, low pour points and are relatively stable chemically. Among the aliphatic dicarboxylic acids suitable for the preparation of the esters used in making the lubricating compositions of the present invention there may be mentioned malonic, succinic, isosuccinic, glutaric, ethyl malonic, pyro tartaric, adipic, pimelic, suberic, azelic and sebacic acid. Instead of one of the enumerated acids, any acid or mixtures of acids having the formula HOOC(R)COOH where R is a bivalent aliphatic hydrocarbon radical—for example synthetic acid produced by polymerization or dimerization of unsaturated fatty acids or their esters—may be used.

The esters which may be used in making the compositions of the present invention have the general formula

where R is a bivalent aliphatic hydrocarbon radical, such as methylene, polymethylene, ethylidine, propylidine, methyl dimethylene butenylidine and the like; $R_1$ and $R_2$ are hydrocarbon radicals such as branched chain alkyl, alkaryl, and cyclo alkyl radicals of which secondary butyl, benzal, cyclohexanol and secondary octyl phenyl are representative. These esters may contain additional substituents or functional groups such as Cl, Br, $NH_2$, NHR, $NR_1R_2$, CHO, CO, SH, SR, RSSR, ROR, RO metal. The esters significant properties are given in the following table:

Table I

| Name of ester | Centistokes viscosity at— | | | Slope on ASTM viscosity-temp. chart for the interval of 210° F. to −40° F. | Visc. index | Flash point | Pour point, °F. | Approx. boiling point, °F. at atmospheric pressure |
|---|---|---|---|---|---|---|---|---|
| | 210° F. | 100° F. | −40° F. | | | | | |
| Di sec. butyl sebacate | 2.09 | 6.42 | 320 | 0.752 | 136 | 355 | −90 | 650 |
| Di-2-ethylhexyl sebacate | 3.31 | 12.64 | 1,532 | 0.707 | 152 | 430 | −90 | 760 |
| Di-undecanyl sebacate | 4.66 | 22.83 | 8,000 | 0.716 | 138.5 | | −85 | |
| Di-2-ethylhexyl alkylated succinate | 5.56 | 42.72 | ¹ 200,000 | 0.812 | 68.5 | | −45 | |
| Di-2-ethylhexyl azalate | 3.05 | 11.25 | 1,200 | 0.729 | 147 | 410 | −40 | 750 |

¹ Extrapolated from the 100 and 210° F. values.

may be made by any of the methods for producing esters known to the art.

A suitable method consists of reacting the alcohol with the acid at elevated temperatures in the presence of an esterification catalyst such as sulfuric acid, sulfosalicylic acid, etc. The reaction is facilitated by a continuous removal of water formed during the reaction by azeotropic distillation with a solvent such as benzene, toluene, etc., or by passing an inert gas through the reaction mixture to remove water of reaction. The product is washed with dilute alkali to remove the catalyst and any traces of unreacted acid, and if necessary is heated under reduced pressure with or without blowing with an inert gas to remove any unreacted alcohol or other low boiling material. If desired the product can be clay treated and finally blotter pressed to remove all traces of solid matter which could harm delicate mechanisms of instruments, etc. in which the product is used as a lubricant.

It is desirable although not absolutely necessary that the finished ester have a neutralization number not higher than about 0.2 mg. KOH/gram of ester to obtain suitable stability to oxidation, since free acids left in the finished material can catalyze oxidation of the product, particularly in the presence of metals such as copper or brass at elevated temperatures. This is illustrated in the oxidation data shown below on di-2-ethyl hexyl sebacate of different initial acidity number. The materials were inhibited with 0.5% 2,6 ditertiary butyl-4-methyl phenol and oxidized in a modified Staeger test. This test entails oxidizing 200 ml. of the liquid in a 400 ml. beaker containing a copper catalyst 40×70×1 mm. at 110° C. in a rotating shelf oven and removing samples of the test liquid periodically for neutralization number determination. The time in hours necessary to obtain an increase in the neutralization number of 0.2 over the original value is regarded as the life of the product.

*Di-2-ethyl hexyl sebacate+0.5% 2,6 ditertiary butyl-4-methyl phenol*

| Original neutralization number | Hours life in Staeger oxidation test |
|---|---|
| 0.5 | 85 |
| 0.3 | 120 |
| 0.2 | 175 |
| 0.1 | 400 |

The results show that the lower the initial neutralization number the greater the oxidation stability of the material.

Typical esters together with some of the more

It is readily apparent from the foregoing data that these typical esters possess the ideal properties with regard to pour point, flash and boiling points necessary to minimize evaporation, viscosity and viscosity temperature characteristics.

Since as outlined above it is sometimes difficult to obtain a uniformly stable ester, it is desirable to add 0.01 to 1.0% of an oxidation inhibitor such as an amine or a phenolic body of which phenyl alpha naphthalamine is representative of the amines and alpha or beta naphthol 2,6 ditertiary butyl para cresol, catechol, guaicol, and tertiary butyl phenol or tertiary butyl phenol sulfide are representative of phenolic bodies. In order to decrease the tendency of the ester to creep, which is desired in instrument lubrication, an anticreep agent to the extent of about 0.01 to 10% may be included in the lubricant. Typical anticreep agents are soaps such as the stearate, naphthenate or sulfonate of a bivalent metal such as zinc, tin, calcium, barium, or certain highly polar dibasic organic acids, such as alkyl succinic, alkylated phthalic, alkyl thio succinic acid, etc.

The invention will be more fully understood by the following blend which was tested by a multiple pin spreading test method employed in the watch and clock industry and outlined below:

| | Percent |
|---|---|
| Di-2-ethylhexyl sebacate | 99.4 |
| 2,6 ditertiary butyl para cresol | 0.5 |
| Alkyl succinic acid | 0.1 |

In conducting the multiple pin spreading test, a number of small drops of the liquid are placed on a polished metal surface, such as steel or brass, by means of metal pins, held in a wooden or cork holder, the ends of which are coated with the test liquid and then are touched to the surface of the polished metal. If the liquid possesses good anti-creep properties, the drops will not coalesce but will retain their original location, otherwise, as in the case of most lubricants, particularly petroleum or fatty oils, they will spread and coalesce in a single smear.

The above-identified blend showed no tendency to creep in this test, even after several months' exposure on polished steel and brass, showing that the product has the desired properties for the lubrication of instruments, clocks, etc.

The addition of the metal soaps such as zinc naphthenate, calcium, lithium or sodium sulfonates has also been found to reduce the tendency of the lubricant to spread or creep and have the further advantage of preventing rusting of ferrous alloys or corrosion of other metals in the presence of moisture contamination, or high humidity and resultant condensation of moisture.

A steel panel which has been sand-blasted to expose a fresh active metal surface was immersed in a solution of 9% of a 30% solution of calcium sulfonates in mineral oil (3% actual sulfonate) in 2 ethyl hexyl sebacate, removed and allowed to drain for 16 hours. The coated panel was then suspended in a humidity cabinet maintained at 100°±2° F. and 95 to 100% humidity in such a manner that frequent condensation of moisture occurred on the test panels. Under these conditions there was no evidence of rust formation after 150 hours although panels similarly treated with mineral oil and with 2-ethyl hexyl sebacate to which the metal sulfonate had not been added showed initial corrosion within 2 hours and severe rusting and pitting after 8 hours. Similar tests on blends of the ester with lithium, sodium and octadecenyl amine sulfonates showed the same ability to prevent corrosion in humidity test as did the ester containing the calcium sulfonate.

Di-2-ethyl hexyl sebacate with and without 0.05% zinc naphthenate was also tested in the ASTM D-665-42T Turbine Oil Rust Test, consisting of testing polished cold drawn steel in the liquid plus 10% distilled water for 48 hours at 140° F. The following results show that the ester plus zinc naththenate completely inhibited rust formation in the test, while the uninhibited product allowed heavy rust formation:

|  | A. S. T. M. D-665-42T turbine oil rust test results on di-2-ethyl hexyl sebacate with and without zinc naphthenate |
| --- | --- |
| Di-2-ethyl hexyl sebacate | Heavy rusting. |
| Di-2-ethyl hexyl sebacate+.05% zinc naphthenate. | No rusting. |

Other substances such as dyes, organic bases, onium compounds, foam suppressors such as silicones, aliphatic or cyclicamines, alkylanol amines, pour depressants, phenol sulfide metal phenates, metal phenol sulfide or thiophosphates, polymers and the like may be incorporated in the instrument oil if desired, to produce particular effects.

What is claimed is:

1. A fluid lubricating composition consisting of 96.5% di-2-ethylhexyl sebacate, 0.5% 2,6 ditertiary butyl para cresol, and 3% calcium petroleum sulfonates.

2. A fluid lubricant composition consisting essentially of di-2-ethyl hexyl sebacate and having incorporated therein an oxidation-resisting amount of 2,6-ditertiary butyl para cresol and a creep-retarding amount of calcium petroleum sulfonate.

JONES I. WASSON.
JOHN C. ZIMMER.

REFERENCES CITED

The following references are of record in the file of this patent:

UNITED STATES PATENTS

| Number | Name | Date |
| --- | --- | --- |
| 1,630,101 | Wilkin | May 24, 1927 |
| 2,158,096 | Werntz | May 16, 1939 |
| 2,334,158 | Von Fuchs | Nov. 9, 1943 |
| 2,355,616 | Barker | Aug. 15, 1944 |